No. 761,507. PATENTED MAY 31, 1904.
P. KREPP.
LATHE.
APPLICATION FILED NOV. 11, 1903.
NO MODEL.

Witnesses:
Geo. B. Rowley
E. E. Patten

Inventor:
Peter Krepp
By N. C. Smith
Attorneys

No. 761,507. Patented May 31, 1904.

UNITED STATES PATENT OFFICE.

PETER KREPP, OF PITTSBURG, PENNSYLVANIA.

LATHE.

SPECIFICATION forming part of Letters Patent No. 761,507, dated May 31, 1904.

Application filed November 11, 1903. Serial No. 180,706. (No model.)

*To all whom it may concern:*

Be it known that I, PETER KREPP, a citizen of the United States of America, residing at Pittsburg, in the county of Allegheny and State of Pennsylvania, have invented certain new and useful Improvements in Lathes, of which the following is a specification, reference being had therein to the accompanying drawings.

This invention relates to certain new and useful improvements in lathes, the object of the invention being to provide means whereby a piece of work having an irregular surface or surfaces of different angular relation to the axis of the piece of work may be turned up in one operation of the tools upon said work.

A further object of the invention is to so arrange and dispose the mechanism that the different tools may be readily changed to conform to different-shaped pieces of work.

The device forming the subject of this application is particularly adapted for turning axle-boxes for vehicle-axles or other like pieces of work having a tapered form.

With the above and other objects in view the invention consists in the novel construction, combination, and arrangement of parts to be hereinafter more fully described, and specifically pointed out in the claims.

In describing the invention in detail reference is had to the accompanying drawings, forming a part of this application, and wherein like numerals of reference indicate like parts throughout the several views, in which—

Figure 1:
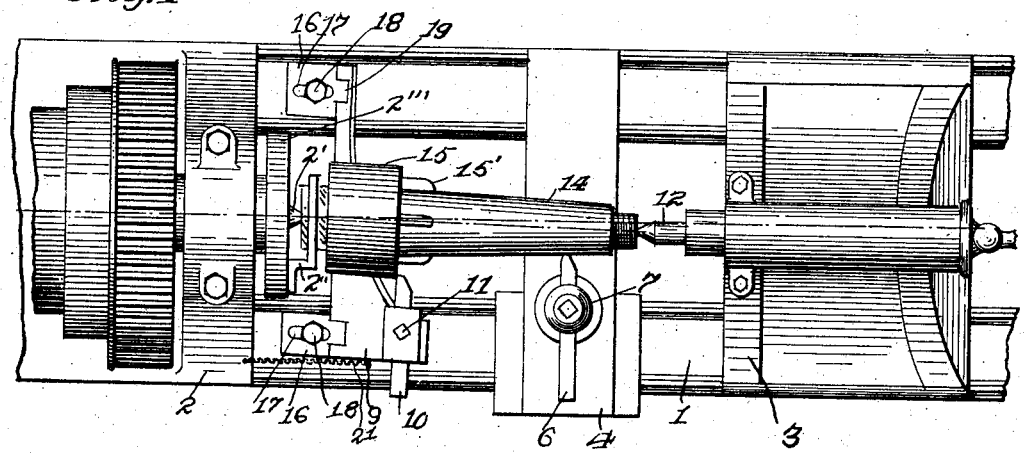
Figure 2:
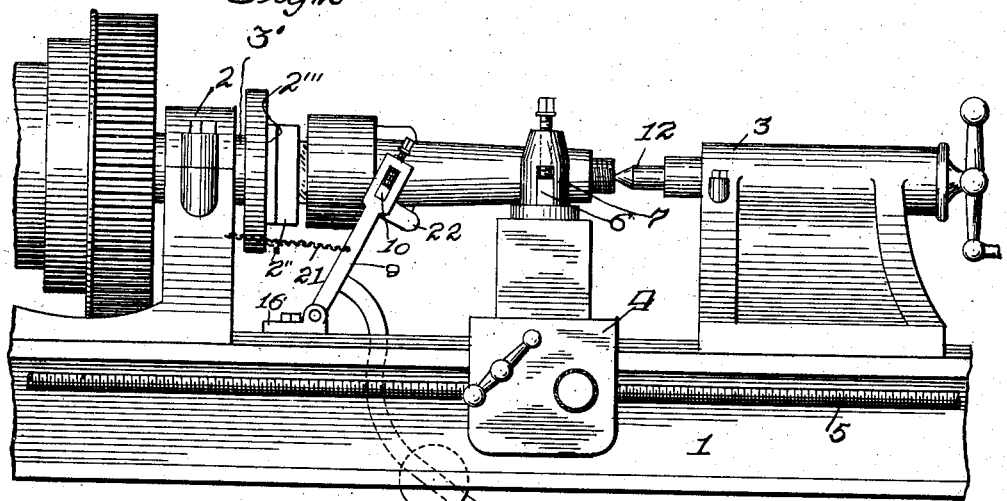
Figure 3:
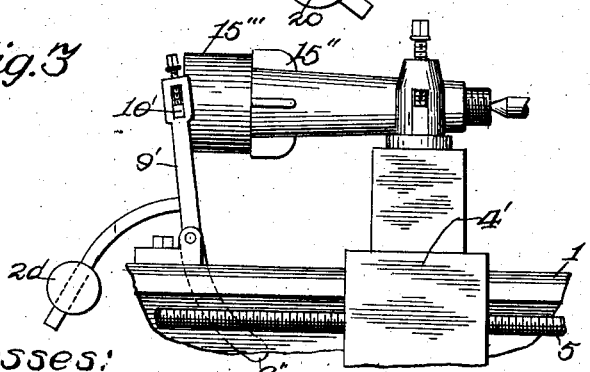

Figure 1 is a plan view of a portion of the lathe, showing my improvements applied thereto. Fig. 2 is a side elevation of the same. Fig. 3 is a fragmentary elevation, showing a modified form of construction.

Referring to the drawings, the reference-numeral 1 indicates the bed of the lathe, upon which is secured in any usual manner the head-stock 2 and tail-stock 3. A carriage of any usual construction is suitably mounted upon the bed in the usual way, and an automatic feed-screw 5 is adapted to feed said carriage, whereby the tool 6, secured in the tool-blocks 7 of said carriage, may be caused to traverse the work. An auxiliary holder 9 is provided, the tool 10 being secured therein by a set-screw 11. In turning up a piece of work the surface of which is of general shape such as illustrated in Figs. 1 and 2, the work is mounted upon a suitable mandrel, one end of which is pivoted on the center 2' in the head-stock 2, and the other end of the mandrel is held by the center 12 in the tail-stock 3. The piece of work is rotated by a dog 2'' of any preferred form, connecting the mandrel with the rotating disk 2''', secured to the drive-shaft 3'.

The center 12 in the tail-stock 3 is moved to such lateral position that the angular surface 14 of the piece of work and on the side upon which the tool is to operate will be parallel with the axis of the lathe, whereby when said tool is fed longitudinally an even cutting of the desired depth may be made along the portion 14 of the said piece of work. As shown in the drawings, the surface 15 of the work is substantially parallel with the axis thereof, and it will be obvious that the tool which is to act on this piece of work cannot therefore travel parallel with the axis of the lathe, as moving of the center 12 laterally has thrown the surface 15 into angular relation to the axis of the lathe, and to provide means whereby the said tool may traverse the portion 15 of the work angularly the auxiliary tool-holder 9 is angularly disposed to the lathe, this being accomplished by connecting the lower portion of the holder, which extends across the lathe at a point below the work, to the adjustable brackets 16, located on either side of the lathe-bed, the said adjustment being accomplished through the medium of the slots 17, formed in said brackets, the screws 18 passing therethrough and into the bed of the lathe, whereby by loosening the said screws the auxiliary tool-holder 9 may be adjusted to the desired angle. The auxiliary tool-holder 9 is connected to the brackets 16 by hinge connection 19, a counterweight 20 being so connected to the auxiliary tool-holder that the same will be normally held in the inoperative position, the movement of said holder being limited by the chain 21, connected between said holder and the head-stock. At one end the holder is provided with an upwardly-projecting portion carrying a boss 22, and the tool-carriage in its movement will contact with said boss 22, and further movement of said carriage will force tool-holder 9, carrying tool 10, longitudinally of the work, whereby the said tool is caused to traverse the portion 15 of the piece of work. As shown in the drawings, the piece of work consists of a hub-bushing, and in Figs. 1 and 2 the holding-lugs 15' are of such size that the tool 10 may readily pass back and forth over the same without contacting therewith; but in the modified construction shown in Fig. 3, where the holding-lugs 15" extend beyond the periphery of the portion 15''' of the piece of work, it would be necessary for the tool to travel in the opposite direction in order not to contact with said lugs, and to accomplish this the auxiliary tool-holder 9' has a counterweight 20' placed on the opposite side from that shown in Figs. 1 and 2, whereby the tool 10' will lie to the left instead of to the right of the work, and as the tool-carriage 4' moves toward the said auxiliary tool-holder the projections 9", connected with said tool-holder below its pivotal connection, is engaged by the tool-carriage 4', whereby the said tool 10' will be moved across the work from left to right.

It will be noted that, as illustrated in Fig. 1, the tool in the auxiliary tool-holder will move in the same direction as the tool in the tool-holder 4; but in the form shown in Fig. 3 after the tool-carriage has contacted with the projections 9" the said tool and auxiliary tool will move toward each other.

While I have herein shown and described my invention in detail, it will be obvious that the principle thereof could be applied to more than two tool-holders for use in cases where more than two surfaces are to be simultaneously machined and that various other slight changes may be made in the details without departing from the general spirit of the invention.

Having fully described my invention, what I claim as new, and desire to secure by Letters Patent, is—

1. In a machine of the type set forth, main and auxiliary tool-holders movable in corresponding directions, means for operating the main tool-holder, and means whereby the auxiliary tool-holder is operated by the main tool-holder after the latter has traversed a portion of its course.

2. In combination with the lathe-bed, a pair of tool-holders mounted thereon and being movable longitudinally thereof, means for moving one of said holders independently of the other, and means whereby said last-referred-to holder at a predetermined point of its travel engages the other holder and forces it through its travel.

3. In a machine of the type set forth, an auxiliary tool-holder pivoted to the bed thereof, and having connection with a flexible means carried by the machine head-stock to support the holder against downward movement, a movable main tool-holder, and means carried by the auxiliary tool-holder for engagement with the main tool-holder whereby the former holder is actuated.

4. In a machine of the type set forth, a main and an auxiliary tool-holder, means whereby the former will actuate the latter, said auxiliary tool-holder being pivoted to the machine-bed and having a counterweight on its one side and a connection with the machine head-stock on its opposite side to limit the downward movement of said holder against the action of said counterweight.

5. In a machine of the type set forth, the combination with the longitudinally-movable tool-holder thereof, of a supplemental pivoted tool-holder disposed in the path of travel of said first-named holder to be actuated by direct engagement therewith after the same has partially completed its travel.

In testimony whereof I affix my signature in the presence of two witnesses.

PETER KREPP.

Witnesses:
A. M. WILSON,
E. E. POTTER.